(12) United States Patent
Giurgiu et al.

(10) Patent No.: US 11,072,338 B2
(45) Date of Patent: Jul. 27, 2021

(54) METHOD, APPARATUS, AND SYSTEM FOR PROVIDING ROAD CURVATURE DATA

(71) Applicant: HERE GLOBAL B.V., Eindhoven (NL)

(72) Inventors: Gavril Giurgiu, Deerfield, IL (US); Joshua Thompson, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 91 days.

(21) Appl. No.: 16/450,485

(22) Filed: Jun. 24, 2019

(65) Prior Publication Data

US 2020/0398856 A1 Dec. 24, 2020

(51) Int. Cl.
| | | |
|---|---|---|
| *G06K 9/00* | (2006.01) | |
| *B60W 40/072* | (2012.01) | |
| *G01C 21/30* | (2006.01) | |

(52) U.S. Cl.
CPC ........... *B60W 40/072* (2013.01); *G01C 21/30* (2013.01); *G06K 9/00798* (2013.01)

(58) Field of Classification Search
None
See application file for complete search history.

(56) References Cited

U.S. PATENT DOCUMENTS

| 7,084,882 B1* | 8/2006 | Dorum | G09B 29/106 345/589 |
|---|---|---|---|
| 7,477,988 B2 | 1/2009 | Dorum | |
| 7,912,879 B2* | 3/2011 | Witmer | G01C 21/32 707/831 |
| 8,566,021 B2 | 10/2013 | Smartt | |
| 9,283,967 B2 | 3/2016 | Lee | |
| 2005/0246091 A1* | 11/2005 | Kuroda | G01C 21/3697 701/532 |
| 2007/0282532 A1* | 12/2007 | Yamamoto | B60R 21/0134 701/301 |
| 2009/0138188 A1* | 5/2009 | Kores | G01C 21/32 701/117 |
| 2012/0116678 A1* | 5/2012 | Witmer | G06F 16/29 702/5 |

(Continued)

OTHER PUBLICATIONS

Misener et al., "VII California: Development and Deployment Proof of Concept and Group-Enabled Mobility and Safety (GEMS)", Published in PATH research report, May 2010, 141 pages.

(Continued)

*Primary Examiner* — Shervin K Nakhjavan
(74) *Attorney, Agent, or Firm* — Ditthavong, Steiner & Mlotkowski

(57) ABSTRACT

An approach is provided for road curvature data. The approach, for example, involves segmenting a road segment or plurality of road segments into a plurality of slices. The approach also involves retrieving location trace data for the plurality of slice. The location trace data, for instance, is collected from one or more location sensors of a plurality of vehicles traversing the plurality of slices. The approach further involves computing respective curvatures for the plurality of slices based on the location trace data. The approach further involves providing the road curvature data for the road segment of plurality of road segments (e.g., comprising an intersection) based on the respective curvatures of the plurality of slices.

18 Claims, 16 Drawing Sheets

(56) References Cited

U.S. PATENT DOCUMENTS

| | | | |
|---|---|---|---|
| 2012/0296539 A1* | 11/2012 | Cooprider | B60W 10/20 701/70 |
| 2014/0149030 A1* | 5/2014 | Chapman | G01C 21/3691 701/119 |
| 2014/0244153 A1* | 8/2014 | Dorum | G01C 21/3632 701/409 |
| 2016/0023661 A1* | 1/2016 | Dorum | B60W 40/06 702/167 |
| 2017/0010105 A1* | 1/2017 | Gdalyahu | B60W 30/10 |
| 2018/0024568 A1* | 1/2018 | Fridman | G06K 9/00791 701/28 |
| 2018/0217612 A1* | 8/2018 | Vladimerou | G01C 21/32 |
| 2019/0071013 A1* | 3/2019 | Adam | B60W 40/04 |
| 2019/0369616 A1* | 12/2019 | Ostafew | G05D 1/0212 |
| 2020/0064850 A1* | 2/2020 | Hong | B60W 30/0956 |
| 2020/0282999 A1* | 9/2020 | Mizrachi | G08G 1/096822 |
| 2020/0348146 A1* | 11/2020 | Yokota | G08G 1/09 |

OTHER PUBLICATIONS

Schroedl et al., "Mining GPS Traces for Map Refinement", Article published in Data Mining and Knowledge Discovery 9(1):59-87, Jul. 2004, pp. 59-87.

* cited by examiner

METHOD, APPARATUS, AND SYSTEM FOR PROVIDING ROAD CURVATURE DATA

BACKGROUND

Autonomous vehicles and vehicles equipped with Advanced Driver Assistance Systems (ADAS) help drivers and passengers to more safely navigate the road network by providing or using road characteristics such as curvature, slope, and elevation of roads. Service providers can generate these road characteristics as map attributes. However, because of the complexity of some roads and intersections, characteristics such as road curvature may not be available or are not calculated for inclusion in mapping data. As a result, service providers face significant technical challenges to calculating road curvatures, particularly at intersections or other complex road junctions.

SOME EXAMPLE EMBODIMENTS

Therefore, there is a need for an approach for providing road curvature data.

According to one embodiment, a method comprises segmenting a road segment or plurality of road segments into a plurality of slices. The method also comprises retrieving location trace data for the plurality of slices. The location trace data, for instance, is collected from one or more location sensors of a plurality of vehicles traversing the plurality of slices. The method further comprises computing respective curvatures for the plurality of slices based on the location trace data. The method further comprises providing the road curvature data for the road segment or plurality of road segments based on the respective curvatures of the plurality of slices. In one embodiment, for an intersection, the method comprises determining a plurality of transitions between a plurality of road segments that form the intersection. The plurality of transitions represents a possible path through the intersection identified based on an originating road segment and an ending road segment of the intersection. The road curvature can then be determined based on respective curvatures of the plurality of transitions.

According to another embodiment, an apparatus comprises at least one processor, and at least one memory including computer program code for one or more computer programs, the at least one memory and the computer program code configured to, with the at least one processor, cause, at least in part, the apparatus to segment a road segment or plurality of road segments into a plurality of slices. The apparatus is also caused to retrieve location trace data for the plurality of slices. The location trace data, for instance, is collected from one or more location sensors of a plurality of vehicles traversing the plurality of slices. The apparatus is further caused to compute respective curvatures for the plurality of slices based on the location trace data. The apparatus is further caused to provide the road curvature data for the road segment or plurality of road segments based on the respective curvatures of the plurality of slices. In one embodiment, for an intersection, the apparatus is caused to determine a plurality of transitions between a plurality of road segments that form the intersection. The plurality of transitions represents a possible path through the intersection identified based on an originating road segment and an ending road segment of the intersection. The road curvature can then be determined based on respective curvatures of the plurality of transitions.

According to another embodiment, a computer-readable storage medium carries one or more sequences of one or more instructions which, when executed by one or more processors, cause, at least in part, an apparatus to segment a road segment or plurality of road segments into a plurality of slices. The apparatus is also caused to retrieve location trace data for the plurality of slices. The location trace data, for instance, is collected from one or more location sensors of a plurality of vehicles traversing the plurality of slices. The apparatus is further caused to compute respective curvatures for the plurality of slices based on the location trace data. The apparatus is further caused to provide the road curvature data for the road segment or plurality of road segments based on the respective curvatures of the plurality of slices. In one embodiment, for an intersection, the apparatus is caused to determine a plurality of transitions between a plurality of road segments that form the intersection. The plurality of transitions represents a possible path through the intersection identified based on an originating road segment and an ending road segment of the intersection. The road curvature can then be determined based on respective curvatures of the plurality of transitions.

According to another embodiment, an apparatus comprises means for segmenting a road segment or plurality of road segments into a plurality of slices. The apparatus also comprises means for retrieving location trace data for the plurality of slices. The location trace data, for instance, is collected from one or more location sensors of a plurality of vehicles traversing the plurality of slices. The apparatus further comprises means for computing respective curvatures for the plurality of slices based on the location trace data. The apparatus further comprises means for providing the road curvature data for the road segment or plurality of road segments based on the respective curvatures of the plurality of slices. In one embodiment, for an intersection, the apparatus comprises means for determining a plurality of transitions between a plurality of road segments that form the intersection. The plurality of transitions represents a possible path through the intersection identified based on an originating road segment and an ending road segment of the intersection. The road curvature can then be determined based on respective curvatures of the plurality of transitions.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing road curvature data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
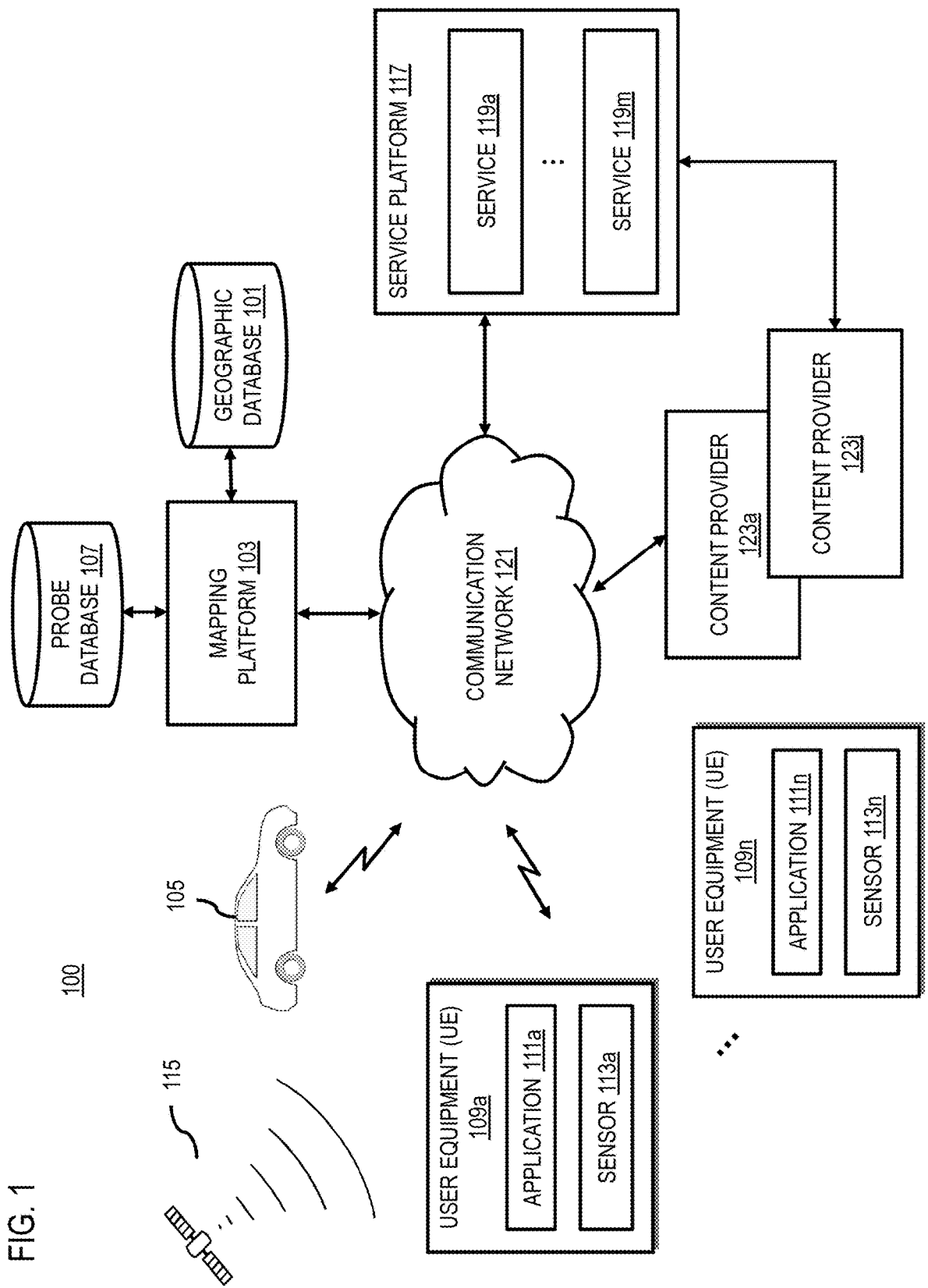
FIG. 1 is a diagram of a system capable of providing road curvature data, according to one embodiment.

FIG. 1 is a diagram of a system capable of providing road curvature data, according to one embodiment. Traditionally, mapping and navigation service providers calculate road curvature from map geometry (e.g., map geometry stored in a geographic database 101 by a mapping platform 103) by fitting splines along the shape points that define the road geometry in digital map data. In general, this approach works well, but it has some limitations:

(1) Curvature may be missing at an intersection point where two splines are joined together;
(2) Any error in the map geometry leads to errors in the derived curvature; and
(3) Splines may be difficult to fit in case of certain geometries with very tight curves, in particular at intersections.

Figure 2:
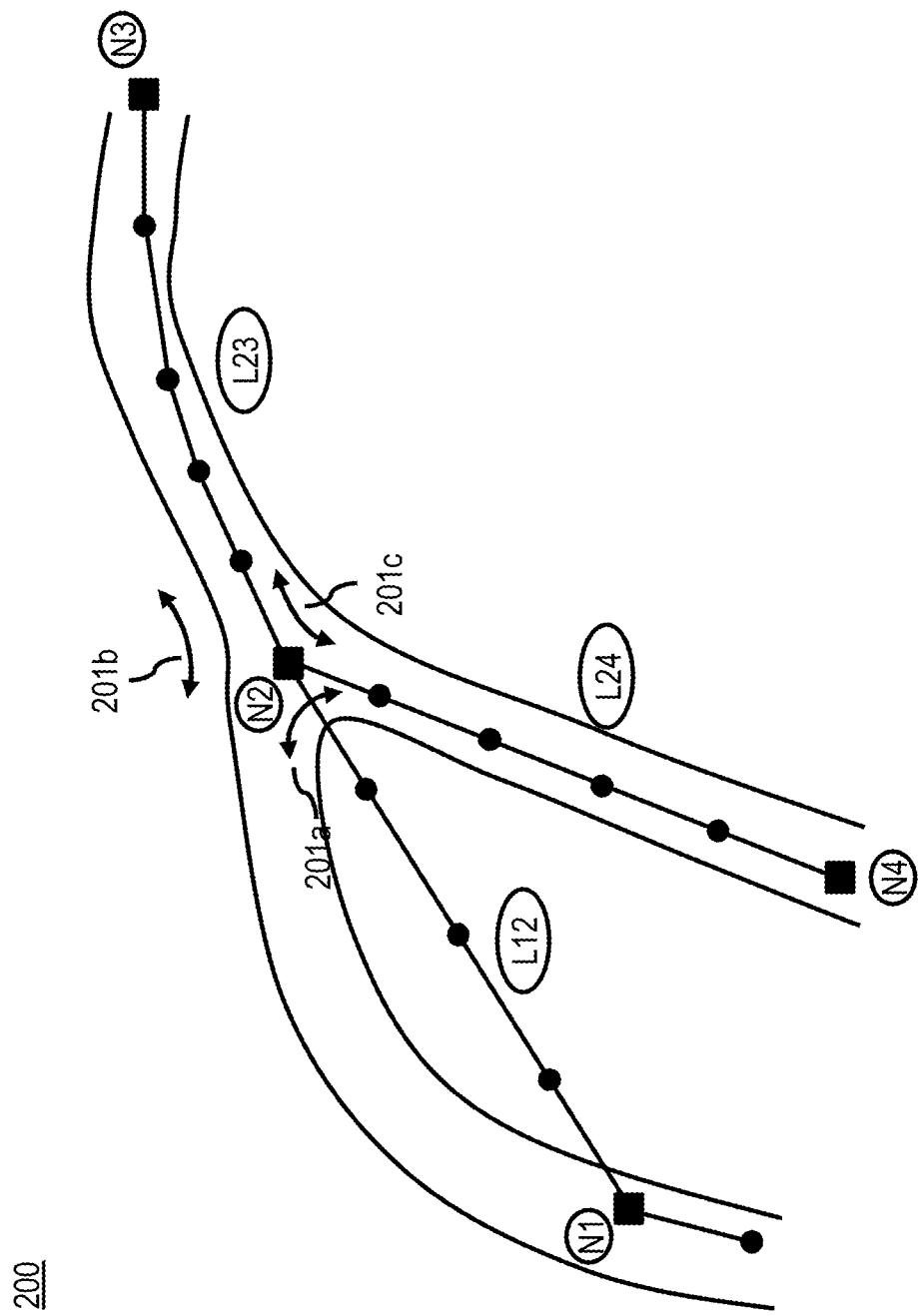
FIG. 2 is a diagram of an example intersection with missing curvature data, according to one embodiment.

FIG. 2 is a diagram of an example intersection 200 with missing curvature data, according to one embodiment. The ends of road segments (e.g., indicated as nodes N1, N2, N3, and N4) are shown by black squares. Shape points along road segments are shown by black dots. Road segments (or links) are labeled as L12, L23 and L24, according to the nodes (e.g., N1-N4) that the segment connects. Node N2 is an intersection. The arrows 201a-201c show the three allowed transitions between the segments at the intersection N2. An allowed transition indicates a road maneuver that is permissible through the intersection N2 (e.g., transition 201a indicates that travel is possible between L12 and L24, transition 201b indicates that travel is possible between L12 and L23, and transition 201C indicates that travel is possible between L24 and L23). In the example of FIG. 2, there are at least three potential issues as described below.

Issue 1: Assume that one spline or smoothing curve is calculated along links L12 and L23 and another spline along link L24. At the intersection point, N2, one can calculate the curvature from L12 to L23 (as the second derivative of the corresponding spline). However, one may not be able to calculate curvatures for the transitions from L12 to L24 and from L24 to L23, if the connection between the two splines is not appropriately smooth to allow calculation of second derivative.

Issue 2: As shown, segment L12 does not accurately follow the road geometry. As a result, the curvature derived from the geometry of this segment will not be accurate.

Issue 3: Even if the L24 spline would connect smoothly to L23 (so that a curvature between L24 and L23 can be calculated), it is sometimes difficult to generate a spline connecting L12 and L24 due to the very large turn angle. In such situation, traditional map data generally does not provide a curvature.

In summary, a traditional method for calculating curvature along a road network is to fit splines (e.g., a mathematical function for interpolating or smoothing) along the shape points that define the road geometry. For example, splines are fitted along stretches of road represented by chains of links/segments. At intersections, these chains can be chosen by following empirical rules, such as following the most important roads or minimum transition angle. This method can work well, in general, but has the potential issues or limitations described above.

Figure 3:
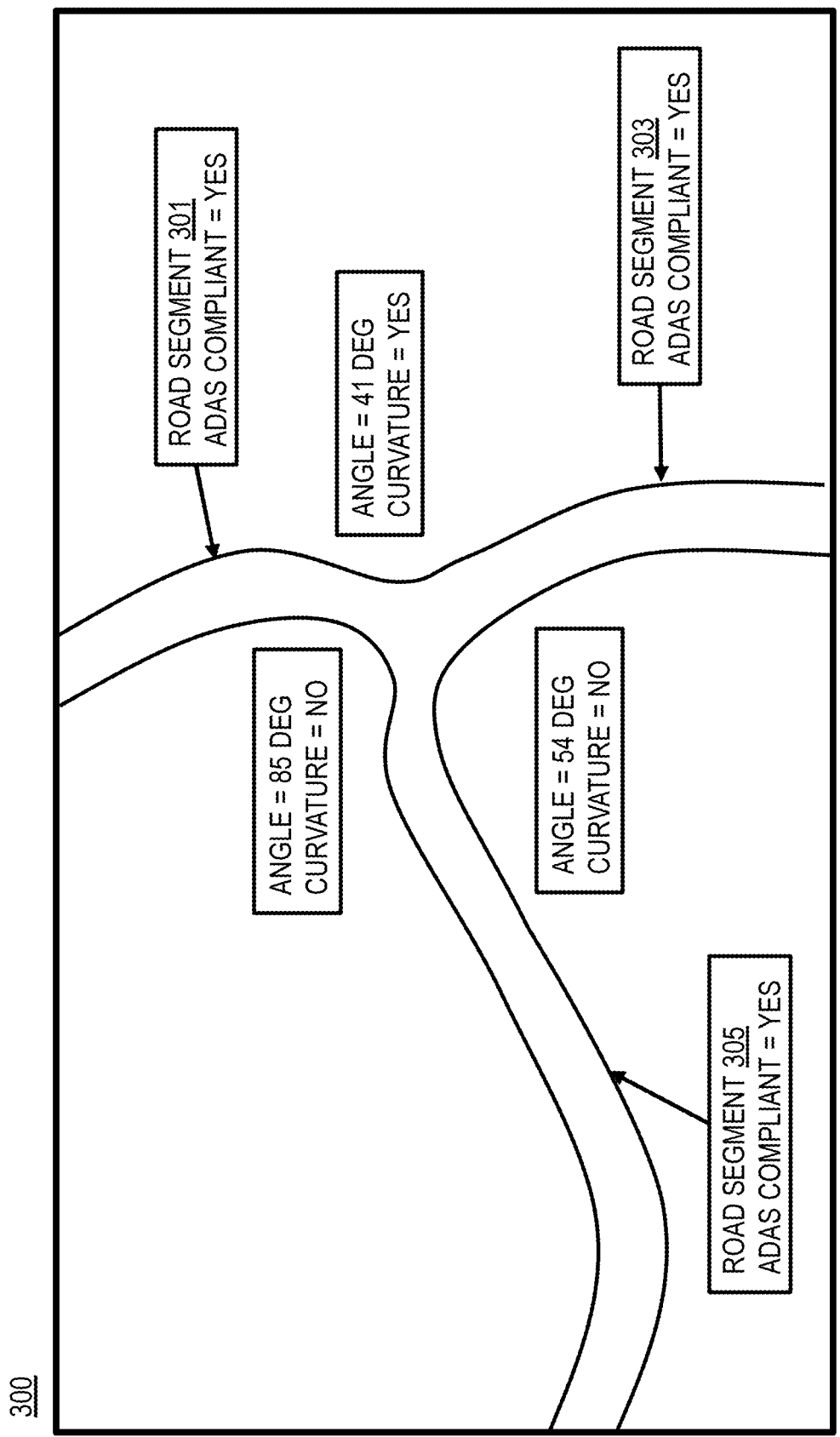
FIG. 3 is diagram of another example intersection with missing curvature data, according to one embodiment.

For example, at certain intersections, such as three-way intersections/ramps/exits, one spline will traverse the intersection along the main road, while another spline (describing the entry/exit or lower importance road) is connected to the main one at a given angle. Such a situation is shown in FIG. 3$_{[MA1][KD2]}$, which is another example intersection 300 with missing curvature data for some road segments of the intersection (e.g., missing curvature is labeled with text indicating "Curvature=No"). In the example of FIG. 3, one spline traverses the intersection connecting segments 301 and 303, while another spline, corresponding to segment 305 is connected to the first spline. At the intersection point, one should be able to provide three curvatures corresponding to the transition between each pair of connecting road segments. However, since the curvature can only be calculated along a spline, but not at the intersection of two splines (if the connection is at an angle), the traditional digital map for intersection 300 provides curvature along the road segment 301 to road segment 303 transition, but not along the other two transitions: (1) road segment 301 to road segment 305 transition, and (2) road segment 303 to road segment 305 transition. Therefore, map service providers face significant technical challenges with respect to providing accurate road curvature data, particularly for road segments there two or more different splines meet.

To address these technical challenges, the system 100 of FIG. 1 introduces a capability to calculate road curvature data from location trace data (e.g., probe data 107) collected from vehicles 105 and/or user equipment (UE) devices 109a-109n (also collectively referred to as UEs 109) respectively equipped with applications 111a-111n (also collectively referred to as applications 111) and sensors 113a-113n (e.g., positioning sensors capable of determining a location based on signals from satellites 115). In other words, the system 100 introduces an alternative to traditional approaches that calculate curvature based on road geometry (e.g., also referred to as the "spline" method) that instead calculates curvature from large samples of location traces or trajectories (e.g., also referred to the "statistical" method).

In one embodiment, the system 100 can use two location-trace based approaches each with multiple variants for processing the location trace data (e.g., probe database 107) to calculate curvature along the road network. These two approaches include curve fitting to location traces and multi-point curvature analysis (e.g., 3-point curvature analysis) of the location traces.

In one embodiment, the curve fitting to location traces includes the following variant embodiments:

(Embodiment A1) Each location trace (e.g., GPS traces) is fit to a smoothing curve such as a spline. A collection of the smooth curves is used to find the average curvature for slices of the road.

(Embodiment A2) A collection of location traces (e.g., GPS traces) is used to fit a single smoothing curve such as a spline. The curvature is calculated from this single smooth curve.

(Embodiment A3) A collection of location traces (e.g., GPS traces) is combined into one sample, which is then sampled from for many curve fits. The curvatures from those fits are then averaged to find the curvature for slices of the road.

In one embodiment, the multi-point curvature analysis includes the following variant embodiments:

(Embodiment B1) Road curvature is calculated along each location trace (e.g., GPS trace) using consecutive overlapping sets of location points (e.g., consecutive triplets).

(Embodiment B2) Curvature is calculated along each GPS trace using triplets of points that span a slice of predetermined width.

In one embodiment, based on the general approach for calculating curvature from location data traces, the system further provides for calculating curvature at intersections, where the spline fitting technique may not always work, as described above. The system 100, for instance, can compute curvatures for possible transitions between the different road segments of the intersection. In this way, the system 100 can provide curvature data for different combinations of entering and exiting road segments of the intersection.

The described embodiments provide several technical advantages including but not limited to improved curvature data that would better assist$_{[MA3][KD4]}$ drivers, autonomous vehicles, Advanced Driver Assistance Systems (ADAS) to navigate the roads, in particular at intersections.

Figure 4:
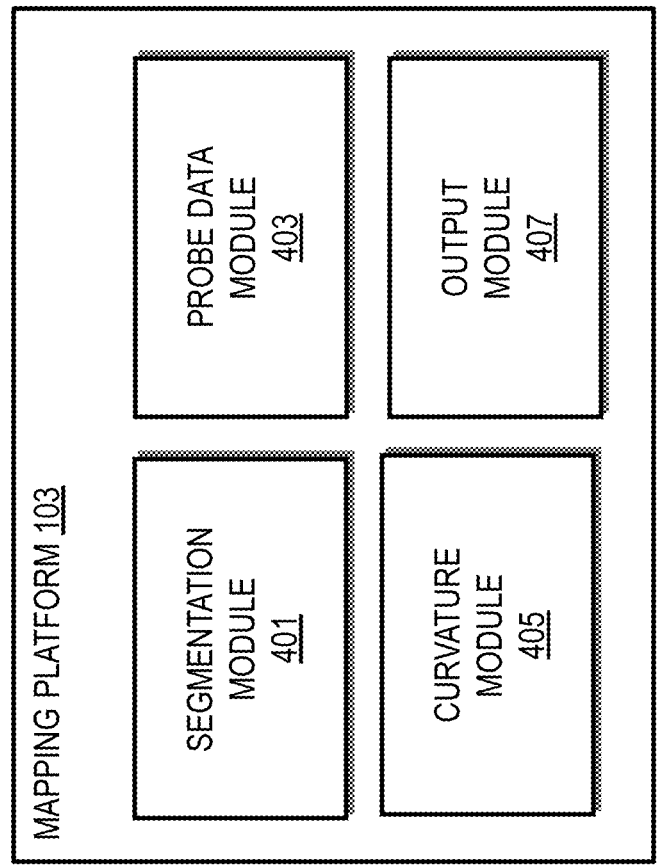
FIG. 4 is a diagram of components of a mapping platform capable of providing road curvature data, according to one embodiment.

In one embodiment, the system 100 includes a mapping platform 103 that is capable of performing one or more functions related to providing road curvature data, according to one embodiment. As shown in FIG. 4, the mapping platform 103 includes one or more components to perform the functions. It is contemplated that the functions of these components may be combined or performed by other components of equivalent functionality. In this embodiment, the mapping platform 103 includes a segmentation module 401, probe data module 403, curvature module 405, and output module 407. The above presented modules and components of the mapping platform 103 can be implemented in hardware, firmware, software, or a combination thereof. Though depicted as a separate entity in FIG. 1, it is contemplated that the mapping platform 103 may be implemented as a module of any other component of the system 100 (e.g., a component of a services platform 117, any of the services 119a-119m (also collectively referred to as services 119) of the services platform 117, vehicles 105, UE device 109, application 111 executing on the UE 109, etc.). In another embodiment, one or more of the modules 401-407 may be implemented as a cloud-based service, local service, native application, or combination thereof. The functions of the mapping platform 103 and the modules 401-407 are discussed with respect to FIGS. 5-10B below.

Figure 5A:
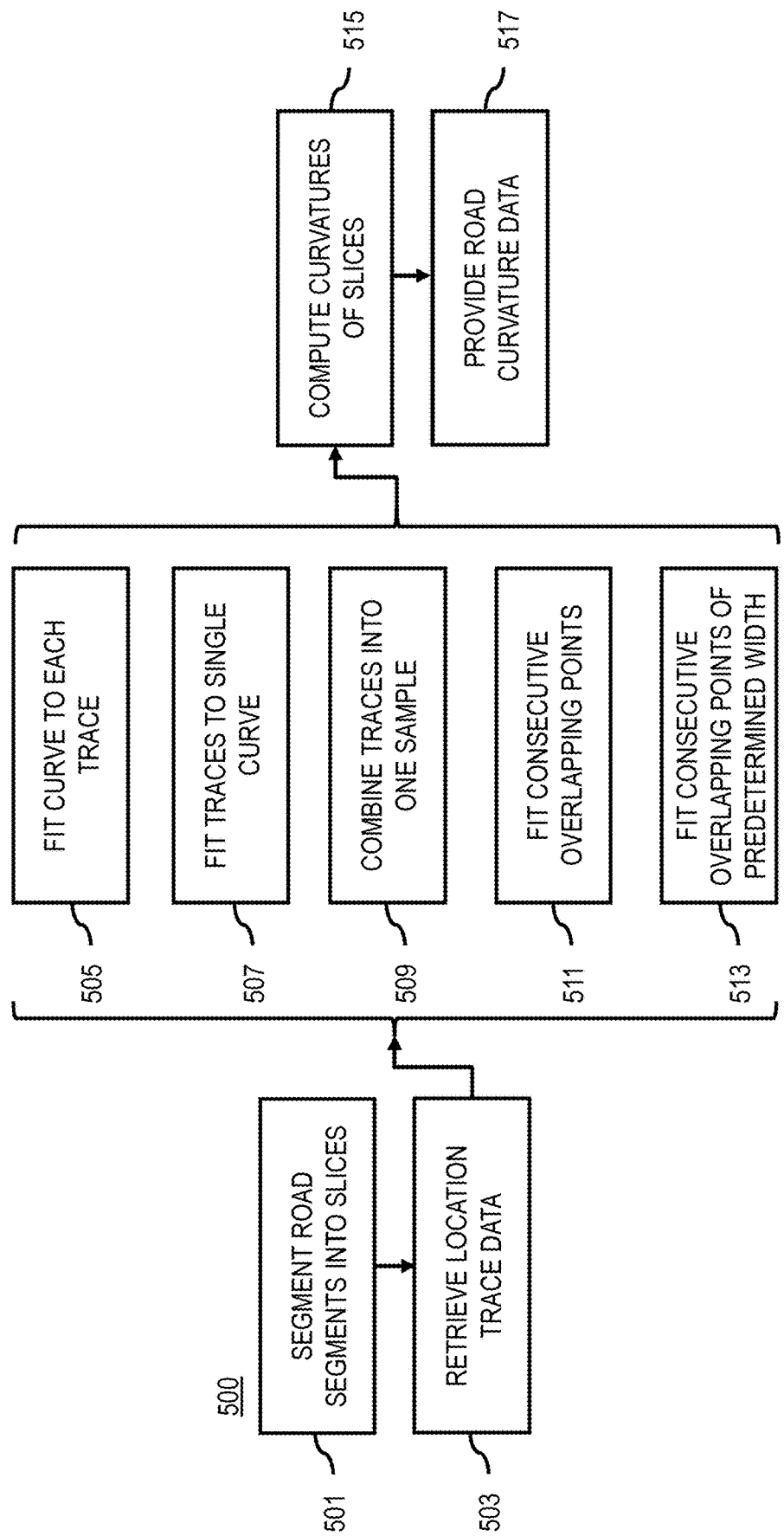
FIG. 5A is a flowchart of a process for providing road curvature data, according to one embodiment.
Figure 13:
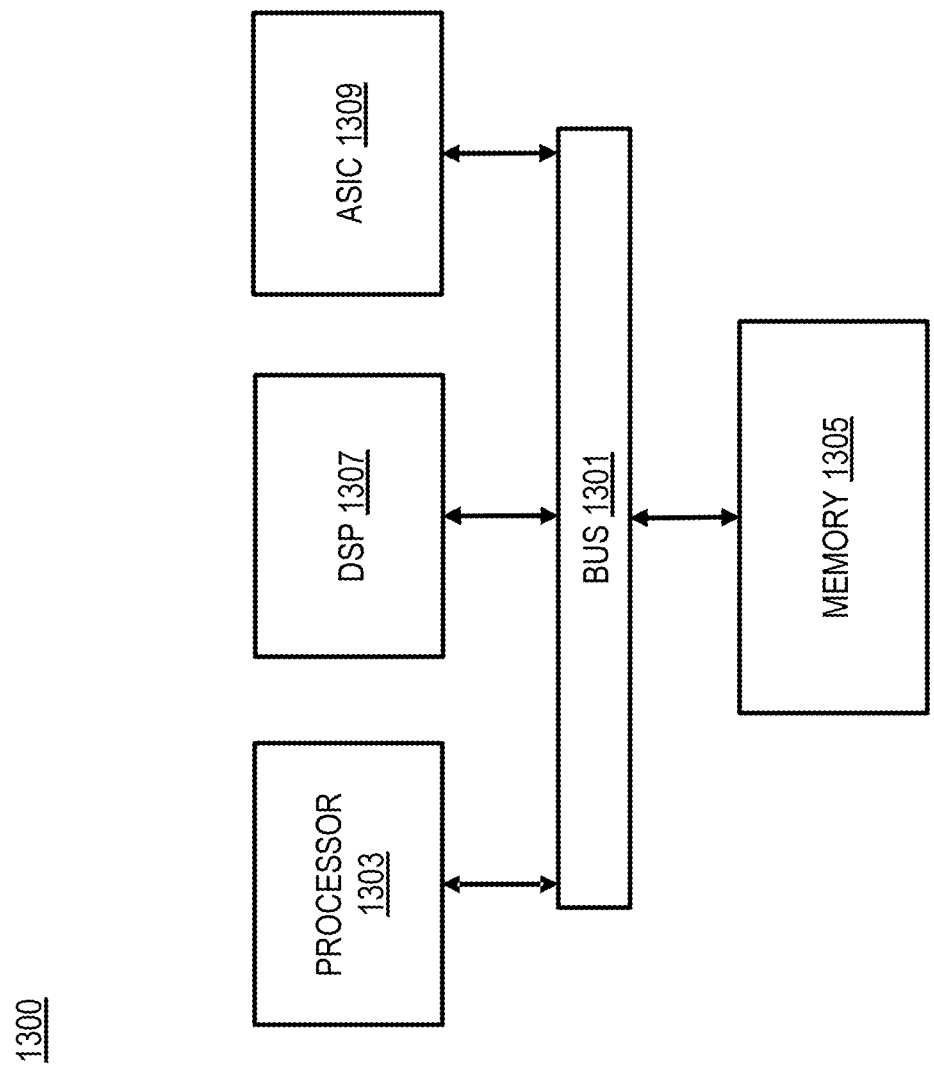
FIG. 13 is a diagram of a chip set that can be used to implement an embodiment.

FIG. 5A is a flowchart $_{[MA5][KD6]}$ of a process for providing road curvature data, according to one embodiment. In various embodiments, the mapping platform 103 and/or any of the modules 401-407 of the mapping platform 103 may perform one or more portions of the process 500 and may be implemented in, for instance, a chip set including a processor and a memory as shown in FIG. 13. As such, the mapping platform 103 and/or the modules 401-407 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In one embodiment, the probe data module 403 optionally starts the process 500 by applying standard data cleaning by removing any location data points (e.g., GPS points) with missing or unreasonable values (e.g., outlier values) from the location trace data that is be processed. As described above, the location trace data can include probe data comprising probe vehicle trajectories comprised of timestamped location samples collected by location sensors 113 of a probe vehicle 105 and/or probe UE device 109, and/or stored in the probe database 107. In addition or alternatively, the probe data module 403 can drop or remove location or probe points which do not obey the expected data frequency (e.g., a location sampling frequency configured for the vehicle 105 and/or UE 109).

Optionally, the probe data module 403 can select only the location points of the location trace data which are separated by a configured number of location error standard deviations (e.g., GPS or equivalent error). For example, assuming that the GPS error is about 7 meters and the threshold standard deviation number is 3, the probe data module 403 may select only the GPS points which are more than 3×7 m=21 meters apart. The rest of the location points (e.g., in between the selected location points) are dropped or removed from the location trace data that is to be process. This advantageously ensures that the mapping platform 103 can avoid back-and-forth location error fluctuations (e.g., GPS fluctuations) when the probe vehicle 105 and/or probe UE 109 are moving very slowly or at rest.

Once the location trace data is optionally cleaned, the probe data module 403 can map match all location traces in the location trace data to the road links of a road network as represented in digital map data (e.g., the geographic database 101). Then, the segmentation module 401 can divide or segment the road network or road segments of interest into slices of a certain length, L (step 501). For example, a road slice could be L=1 km long or any other designated length or width. The start and end of the road slices, in general, do not or need not correspond with road intersections. Instead, these slices, in general, may span across intersections, junction, or other road network structures that combine or include multiple road segments or links.

In step 503, the probe data module 403 retrieves location trace data for the plurality of slices, for instance, by collecting the location trace data from one or more location sensors 113 of probe vehicles 105 and/or UEs 109 traversing the slices. In other words, for each road slice, the probe data module 403 collects all GPS or location traces that traverse the slice, either completely or partially. In one embodiment, in order to ensure smoothness of the calculated curvature at the slice junctions, the probe data module 403 can include location points from a distance X upstream and/or a distance X downstream of the slice of interest. The distance X can be any designated length including but not limited to being smaller than the slice length L. For example, for a slice length of 1 km, the extra length could be X=50 meters. In other words, the segmentation module 401 can optionally extend the road slices by a predetermined upstream distance, a predetermined downstream distance, or a combination to compute the respective curvatures. The predetermined upstream and downstream distance can be different distances or the same distances.

Figure 6:
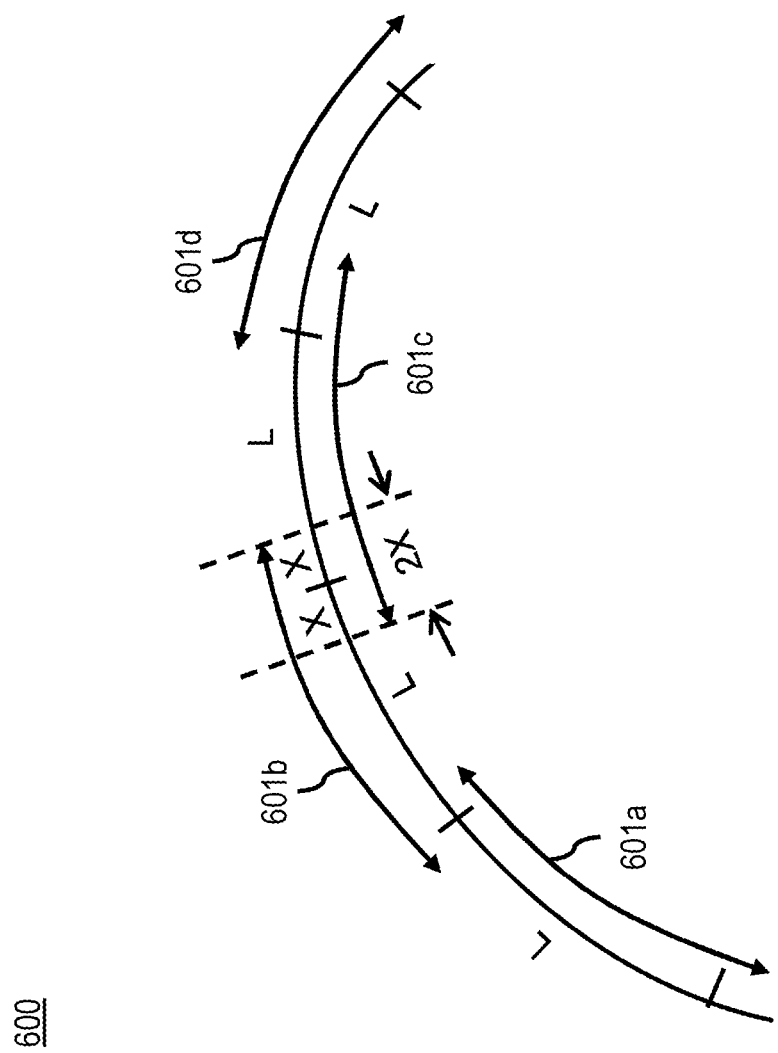
FIG. 6 is a diagram of an example road segment divided into slices, according to one embodiment.

In this way, the location traces associated with consecutive slices overlap over a distance of 2X (e.g., when the upstream and downstream distances are the same, or X+Y if the distances are different and X is the upstream distance and Y is the downstream distance), and such, can ensure smoothness of the derived curvature. As shown in FIG. 6, the road 600 is divided into slices 601a-601d of length L. For each slice 601a-601d, location traces (e.g., GPS traces) contained within the segment defined by: "X meters before slice"+"L meters slice"+"X meters after slice" are collected. The lengths of these "virtual segments" or extended slices 601a-601d are shown in FIG. 6. Consecutive "virtual segments" overlap over a 2× distance ensuring curvature smoothness at the connection point of two road slices (e.g., between slices 601b and 601c).

After dividing the road segments into slices and retrieving the corresponding location trace data for the slices, the curvature module 405 can compute respective curvatures for the slices based on the location trace. The curvature module 405 can use any process to derive a curve from the location trace data corresponding to each slice such as at least one of the various embodiments and variants described below with respect to processes or steps 505-513. It is noted that curvature computation can be based on any one or more of the embodiments or variants described in steps 505-513.

In one embodiment (i.e., Embodiment A1), each of the location traces associated with a given slice is fit with a continuous curve to generate a collection of curves (step 505). It is noted that the fit is applied to the raw GPS positions location traces, and not to the map matched positions. In other words, the map matching described above is used for segmenting and attributing the location trace data to a given slice and not for calculating curvature. Such fitting curve could be a spline (e.g., B-splines), Gaussian process, or any other methods that fit an appropriately smooth curve through the location points (e.g., raw GPS location coordinates reported from the sensors 113) (step 515). In one embodiment, along the fitted curve, the curvature module 405 can calculate the heading and the curvature of the road as, for instance, the first and second derivatives of the curve. In one embodiment, the curvature can be calculated at fixed intervals of length I. For example, the curvature could be calculated every I=10 meters such that each curvature is computed from a single curve determined from a subset of the collection of curves. For each interval I, the curvature module 405 can collect all the curvatures from all location traces that passed through the corresponding slice. In addition, the curvature module 405 can apply outlier rejection, for example, by dropping any values more than a designated number of standard deviations (e.g., three standard deviations) away from the mean. For example, the curvature module 405 can define the curvature of the interval I as either the mean, median, most probable value, and/or the like of all the curvature values in that interval.

In one embodiment, to save storage space, the output module 407 can keep only the curvatures when the difference between consecutive values for consecutive intervals I are larger that certain threshold, T. For example, T=1/10 inverse meters. In another embodiment, the output module 407 can provide an output comprising curvature for segments of lengths commensurate with the radius of curvature. For example, if the radius of curvature is R=50 meters, then, the output module 407 can associate the curvature with a segment of R/2=25 meters.

In another embodiment of the process for curvature calculation (i.e., Embodiment A2), the curvature module 405 can perform a similar process to Embodiment A1, but instead of fitting each trace separately to a curve, the data from all of the location traces in a slice is aggregated and fit to a single curve (step 507). In other words, the curvature module 405 determines a subset of the location trace data associated each slice of the plurality of slices and then computes a single curve for each of the subset of the location trace data. Each of the respective curvatures is computed based on the single curve for said each slice. Optionally, weights are applied to each data point to account for the different contributions to the dataset from each trace (for example, weights of 1/m could be applied where m is the number of points in the location trace entering the dataset). This aggregate dataset is then used in a fit to a curve such as a spline (or other smooth curves as described above). This results in a single smooth curve to describe the dataset, from which curvature can be calculated via the first and second derivatives (step 515).

In step 509, Embodiment A3 is a hybrid of Embodiments A1 and A2. Similar to Method A2, the data from all of the traces crossing a slice is aggregated. The curvature module 405 can then repeatedly pull random subsamples from the combined data (each with fixed number of points N sample). Each random subsample is fit to a smooth curve as described with respect to Embodiment A1. It is noted that each random subsample will be a mixture of data from different traces. In other words, the curvature module 405 can combine the plurality of location traces into one location sample from which additional subsamples can be drawn to compute respective curvatures. As in Embodiment A1, the resulting collection of smooth curves can be used to calculate the mean curvature at points along the segment, and those curvatures are averaged at each point to obtain the final results (step 515).

In Embodiment B1 (step 511) and Embodiment B2 (step 513), the curvature module 405 calculates curvature from location traces using triplets or other multi-point subset of sequential location points (e.g., GPS positions). In one embodiment, the curve for the subset can then be computed as the radius of the circle passing through the points of the subset (e.g., the three points). In a triplet use case, as three points define a unique circle, determining the radius of curvature is a matter of applying simple geometrical formulas to advantageously reduce computational complexity and computational resource requirements (e.g., processing, memory, storage, etc. resources) for performing the calculation. In one embodiment, the triplet or subset may contain consecutive GPS points (Embodiment B1), or points can be skipped so that the same number points can span a predetermined width of a slice (Embodiment B2). In addition, in one embodiment, the triplets or subset may have overlapping points. In summary, under Embodiments B1 and B2, the curvature module 405 segments the plurality of location traces into consecutive overlapping subsets of location points, and then computes a subset curvature for each of the consecutive overlapping subsets of location points. The respective curvatures are computed based on the subset curvature for each of the consecutive overlapping subsets of location points (step 515).

Figure 7:
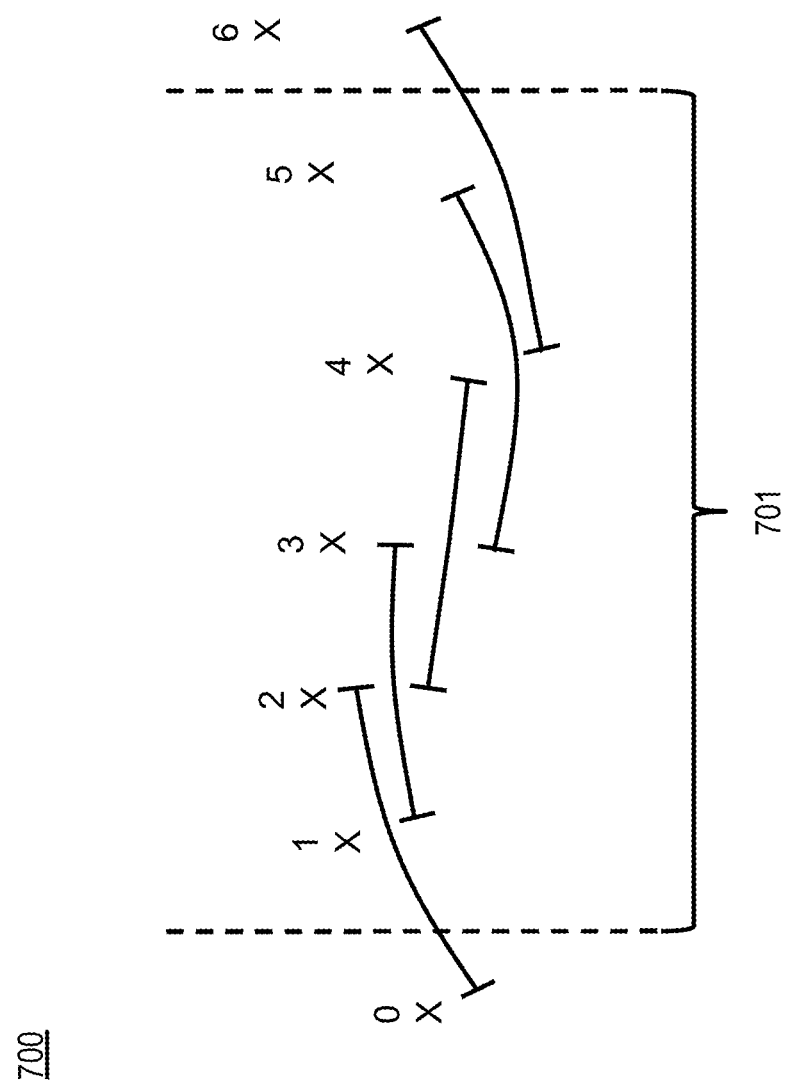
FIG. 7 is a diagram of using a subset of points to calculate road curvature, according to one embodiment.
Figure 8:
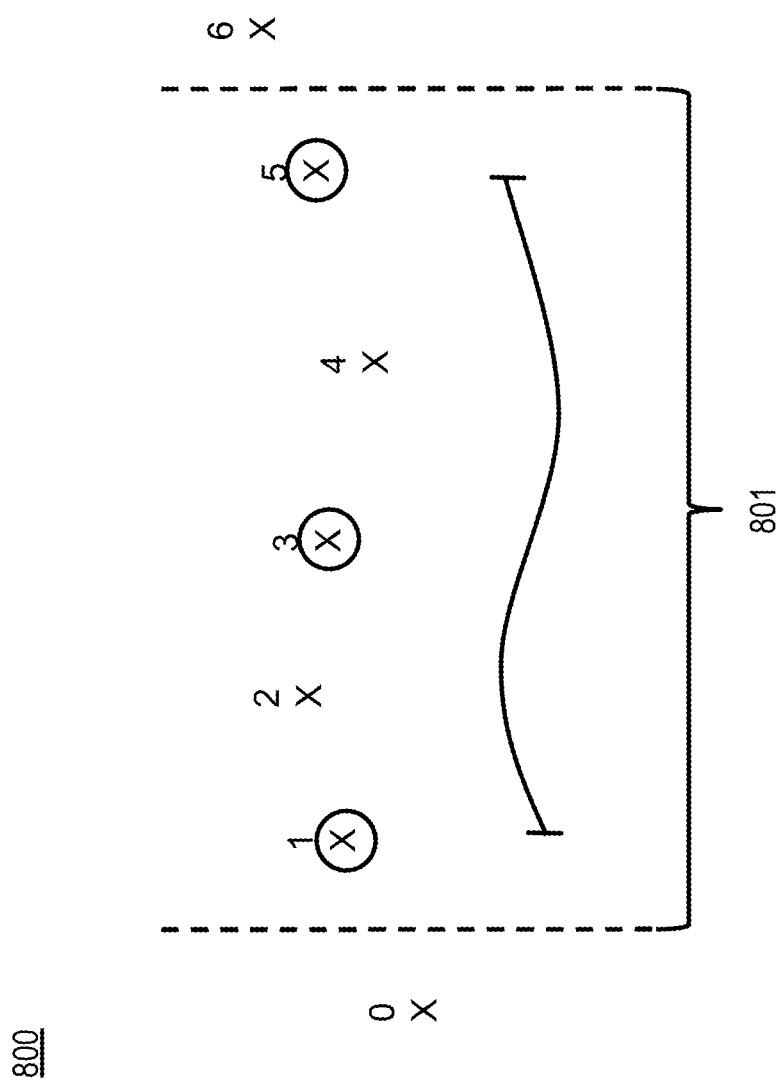
FIG. 8 is a diagram of using a subset of points spanning a predetermined width to calculate road curvature, according to one embodiment.

An example application of Embodiment B1 to a series of points in a location trace is illustrated in FIG. 7, according to one embodiment. As shown in example 700, location points in a trace are indicated by 'x'. In an example implementation of Embodiment B1 using a triplet as the subset of point, each subsequent set of three points (i.e., each triplet) is used to calculate the curvature. In one embodiment, a curvature value is calculated for triplets (0,1,2), (1,2,3), (2,3,4), (3,4,5), and (4,5,6) (e.g., based the radius of the circle passing through the three points). Each curvature value, for instance, is assigned to the position associated with the middle point (or any other selected point) of the triplet or subset. The vertical dashed lines indicate the width of a pre-determined slice 701 along the road.

Alternatively (Embodiment B2), instead of using three or another designated number of consecutive location points from each trace, the curvature module 405 chooses a slice width along the road. Within each slice, the curvature module 405 take the two points from each trace that span the slice, plus the specified number of points in the middle. For example, when using a triplet the first and last points correspond to the location points of the trace corresponding to the beginning and end of the slice and the middle point corresponds to the location point of the location trace closest to the middle of the slice. Then, curvature module 405 uses those three or other designated number of points to calculate the curvature of the slice. An example implementation of Embodiment B2 is illustrated with respect to FIG. 8. As shown, location points in a trace are indicated by "x" and point labels "0" to "6". In Embodiment B2 using a triplet as the subset of points, the location points in a slice of road are taken together, and a curvature is calculated from the outermost points in the slice plus the point in the middle. In this example 800, the triplet includes points (1,3,5). The dashed vertical lines indication the edges of the slice 801. In one embodiment, the slices can overlap to ensure smoothness and/or dense enough curvature calculation.

As in Embodiment A1, Embodiments B1 and B2 aggregate the curvature values from many traces using the mean value, median, mode, and/or the like in each slice. In the various embodiments, several techniques for taking the mean are possible: all of the curvature values in a slice from the many traces can be simply averaged, or the values from each trace can be averaged with a subsequent computation of the mean of the averages in a slice. In addition, weights for the location traces and/or location points in the traces can also be incorporated for calculating road curvature data.

In step 517, after the curvatures of the slices of the road are computed according to the embodiments described herein, the output module 407 can provide the computed road curvatures as road curvature data for the road segments that were evaluated (e.g., road segments forming an intersection as described with respect to FIG. 9 below). In one embodiment, the output can be used to provide location-based services and/or applications that make use of road curvature data. Examples of these service and/or application include but are not limited to mapping, navigation, user alerts, autonomous driving, and/or the like. For example, with respect to mapping, the road curvature data computed according to the embodiments described herein can be stored as a road attribute of the geographic database 101. Various location-based services and/or applications can then retrieve the road curvature data from the geographic database 101.

One example application can include but is not limited to providing alerts or notifications to warn drivers of roads with curvatures above a threshold value. As a driver travels along a road network, the system 100, vehicle 105, UE 109, or other equivalent system or device can determine the road that a user is traveling or is expected to travel (e.g., based on current positioning data, travel history, computed navigation routes, etc.). The road curvature data can then be retrieved from the geographic database 101 or equivalent and compared to a threshold value used to distinguish high curvature roads. If the retrieved road curvature exceeds the curvature threshold, an alert or notification message is generated and presented to the driver via a user interface to inform the driver of the upcoming high curvature road. In an autonomous driving use case, an autonomous vehicle 105 can use the retrieved road curvature data to automatically adjust its autonomous driving. For example, the autonomous vehicle 105 can slow down in areas of high road curvature or request that a human operator take manual control.

Figure 5B:
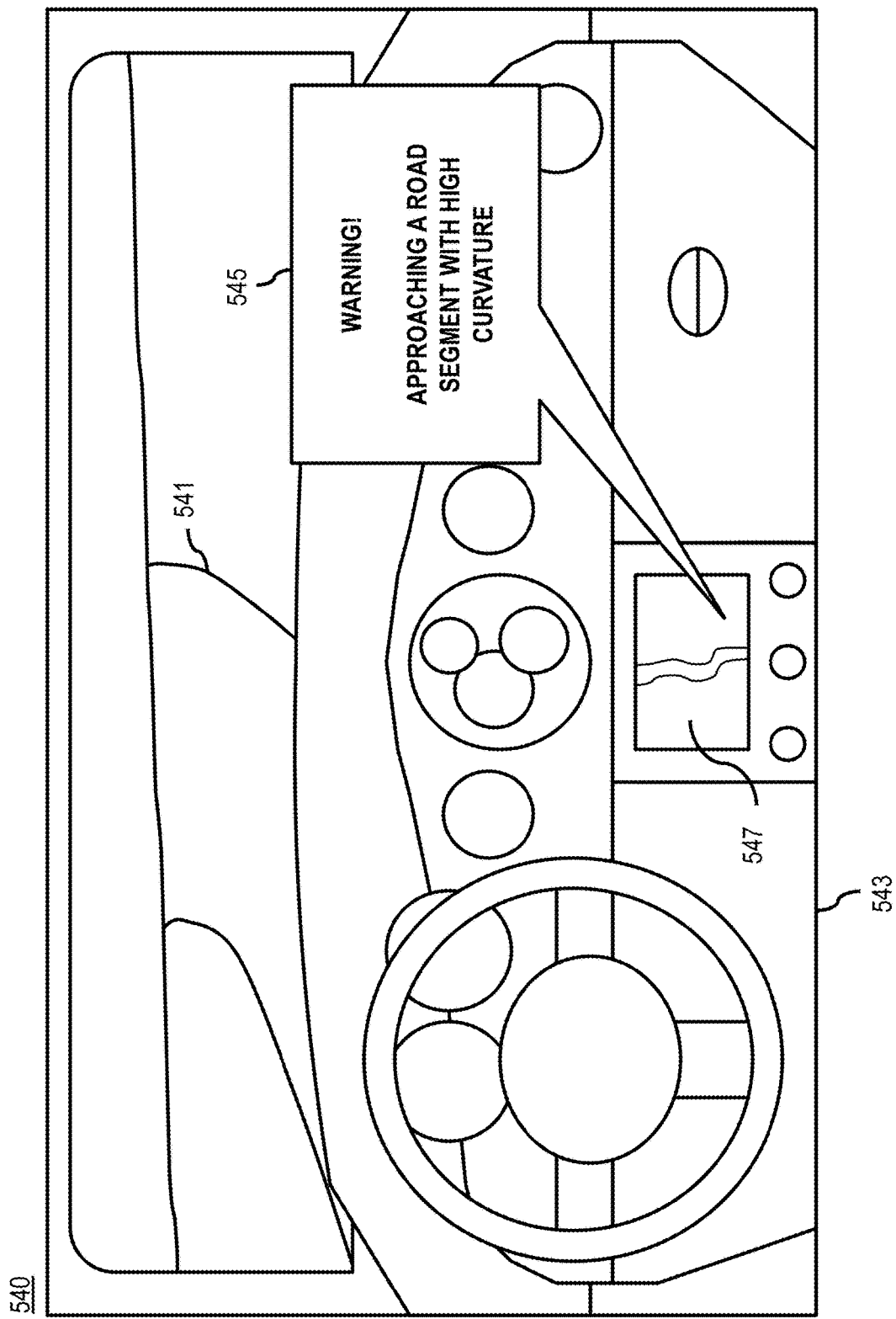
FIG. 5B illustrates an example user interface for presenting a notification based on road curvature data, according to one embodiment.

FIG. 5B illustrates an example in-vehicle UI 540 that presents a warning to a driver based on a road segment 541 having a road curvature value above a threshold value, according to the embodiments described herein. In this example, a driver of a vehicle 543 is approaching the road segment 541 using navigation, mapping, and/or autonomous driving system 547 that relies on digital map data incorporating road curvature data generated according to the embodiments describe herein. The system 547 of the vehicle 543 can use the road curvature data to identify that the road segment 541 has a road curvature that exceeds a threshold value. In response, a warning message 545 is generated and then presented via the in-vehicle system 547 to warn the driver that the vehicle 543 is "Approaching a road segment with high road curvature." In a use case where the vehicle 543 is operating in autonomous driving mode, the in-vehicle system 543 can instruct the driver to take manual control or the system 543 can take or recommend a more conservative path through the road segment 541 in response to the high road curvature.

Figure 9:
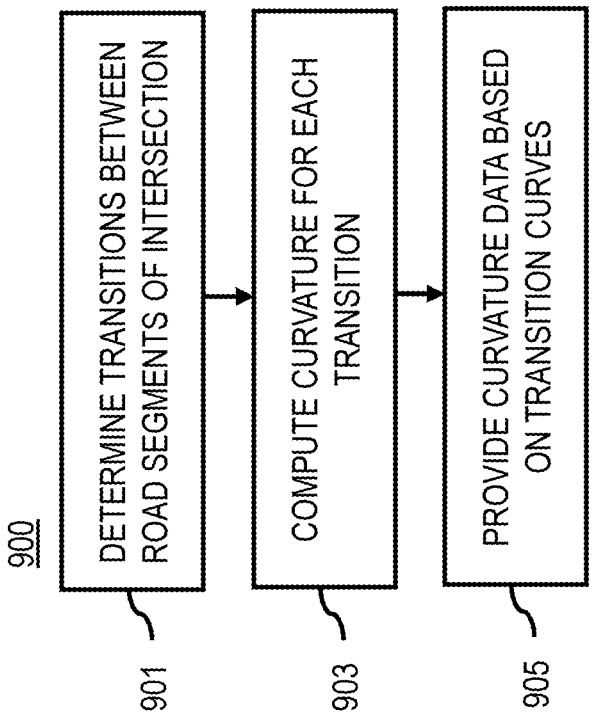
FIG. 9 is a flowchart of a process for providing road curvature data at an intersection, according to one embodiment.

FIG. 9 is a flowchart of a process for providing road curvature data at an intersection, according to one embodiment. In various embodiments, the mapping platform 103 and/or any of the modules 401-407 of the mapping platform 103 may perform one or more portions of the process 900 and may be implemented in, for instance, a chip set including a processor and a memory as shown in FIG. 13. As such, the mapping platform 103 and/or the modules 401-407 can provide means for accomplishing various parts of the process 900, as well as means for accomplishing embodiments of other processes described herein in conjunction with other components of the system 100. Although the process 900 is illustrated and described as a sequence of steps, its contemplated that various embodiments of the process 900 may be performed in any order or combination and need not include all of the illustrated steps.

As discussed above, the traditional "spline" method for calculating curvature may not always work at intersections, e.g., when two splines join at an angle, or when the turning angle is very large (tight turns). The various embodiments of the "statistical" method described above address these problems. Consider again the intersection shown in FIG. 2, there are six possible transitions from each road segment to each of the other two road segments. Each of these six transitions is characterized by a different curvature. Even the two transitions, in opposite directions, between two segments have different curvatures, as the "right" turn is, in general, slightly tighter (higher curvature) than the "left" turn (lower curvature). Accordingly, in one embodiment, the process 900 can be used to determine the curvatures for an intersection based on the transitions possible in the intersection.

Figure 10A:
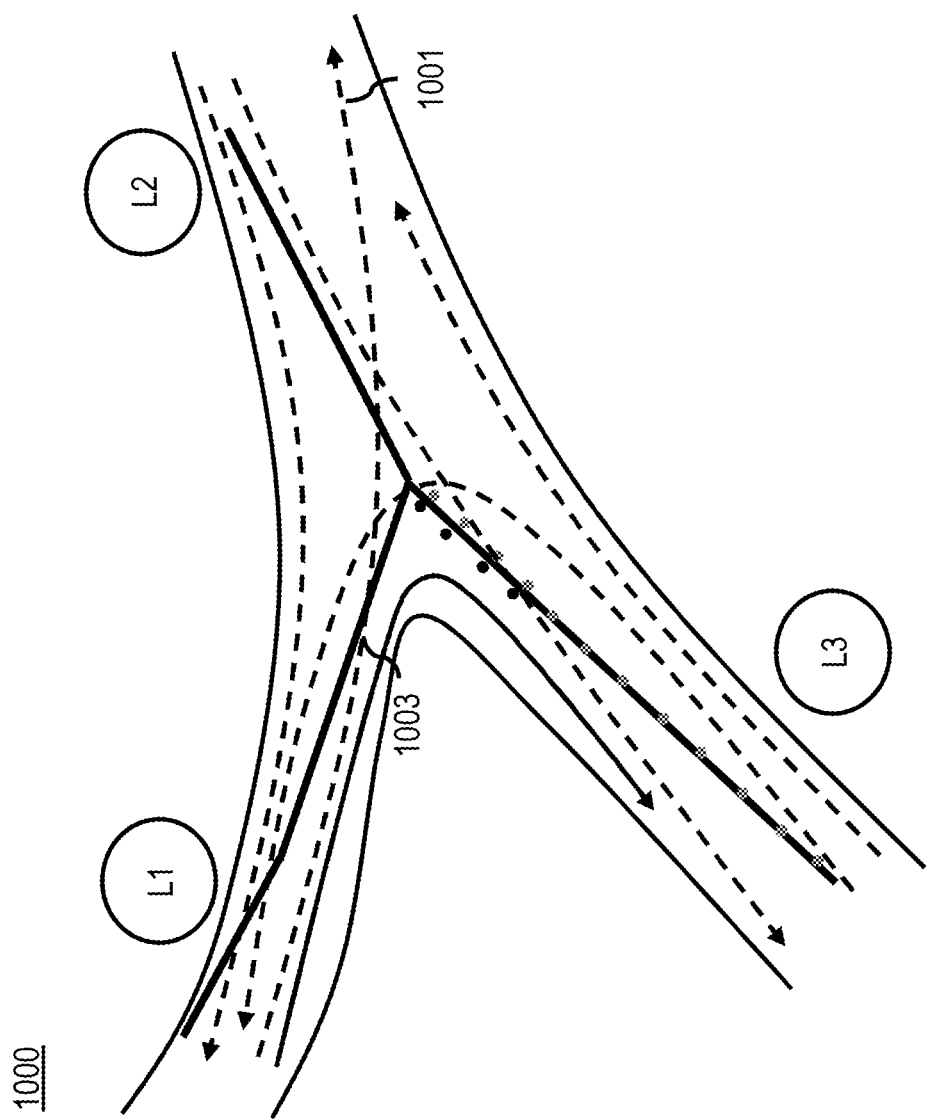
FIGS. 10A and 10B are diagrams of an example of providing road curvature data at an intersection, according to one embodiment.

In step 901, the curvature module 405 determines a plurality of transitions between a plurality of road segments that form the intersection. The plurality of transitions represents a possible path through the intersection identified based on an originating road segment and an ending road segment of the intersection. To calculate the curvature along each possible transition in an intersection, we separate the corresponding vehicle streams, as shown in FIG. 10A, where each vehicle location trace stream is visualized by a different curved arrow. The probe data module 403, for instance, retrieves location trace data for the plurality of transitions by separating the location traces belonging to each transition into different streams for each transition. For each separate stream, the curvature module 405 applies the method of calculating curvature described with respect to the embodiments of the process 500 of FIG. 5. By way of example, the process includes dividing the road along the stream in slices of length L. For each slice, the segmentation module 401 extends the slice by X meters upstream and/or downstream. For each extended slice, the curvature module 405 applies one of the curvature calculation embodiments described above (Embodiments A1, A2, B1, and/or B2). The result is that the curvature is calculated for interval of length L, across the intersection for all six transitions (step 903). It is noted that this approach can be applied to any intersection, with any number of connected roads (e.g., 3-, 4-, 5-way intersections, etc.) given that enough location traces are available.

Figure 10B:
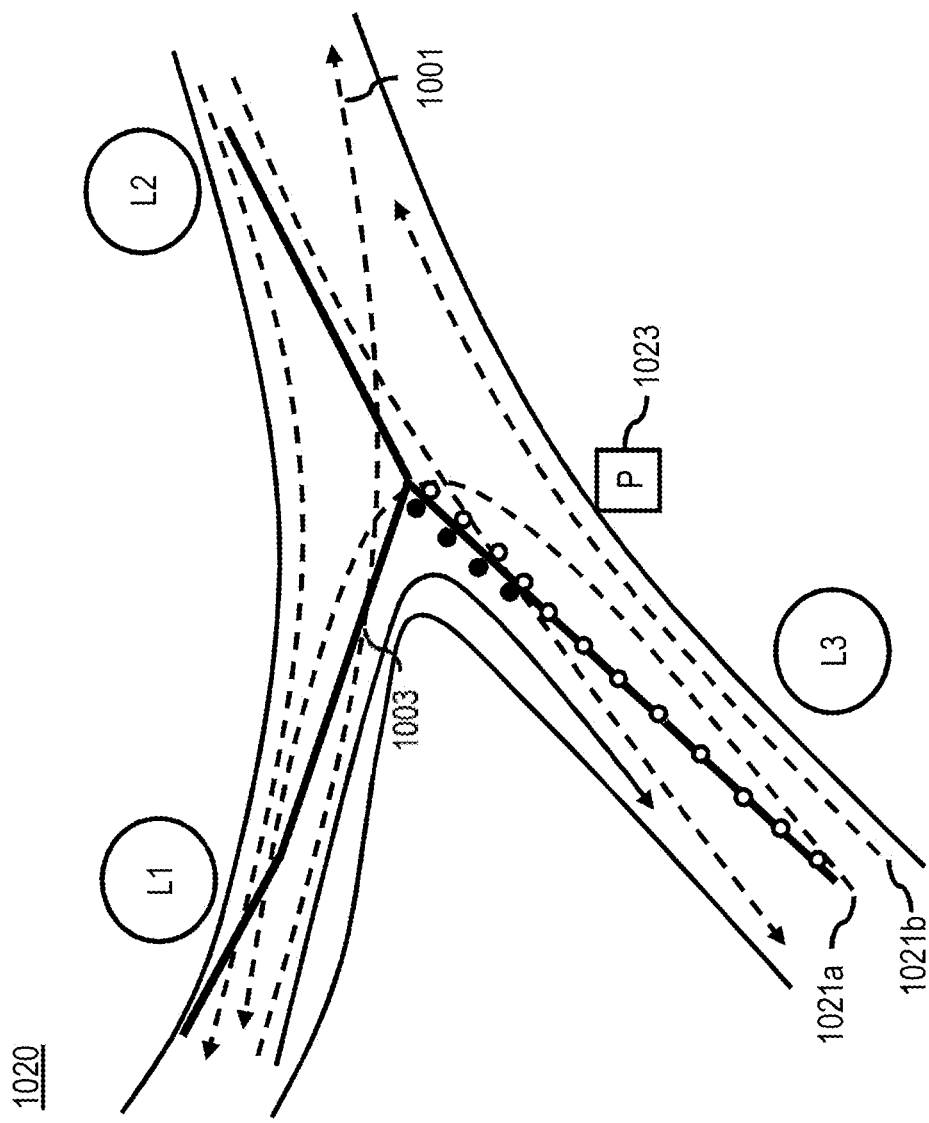

FIGS. 10A and 10B are diagrams of an example of providing road curvature data at an intersection, according to one embodiment. In the example 1000 of FIG. 10A$_{[MA7]}$ $_{[KD8]}$, at each intersection, the probe data module 403 separates the stream of vehicles that follow each possible transition. In this case, there are six possible transitions (e.g., indicated by dashed lines 1001), from each link to each of the other two links: L1<->L2, L1<->L3, L2<->L1, L2<->L3 and L3<->L1, L3<->L2, where L1, L2 and L3 are the three links (road segments) connected to the intersection. The map geometry of the intersection is shown by black lines 1003. The example of 1020 of FIG. 10B considers the road segment (link) labeled as "L3". The two vehicle streams transitioning from segment L3 to segment L1 (e.g., indicated by dashed line 1021*a*) and transitioning from segment L3 to segment L2 (e.g., indicated by dashed line 1021*b*) are parallel until a certain position, P, along the link (e.g., indicated by box 1023). After position P 1023, they start to diverge. While, before P, the vehicle streams 1021*a* and 1021*b* are parallel, the corresponding curvatures (calculated at the positions of the red dots) are the same (within tolerance). Along the section of the road in which the two streams 1021*a* and 1021*b* are parallel, as indicated by curvature values consistent with each other (e.g., different by less than a chosen$_{[MA9][KD10]}$ threshold), the curvature module 405 averages the curvatures from the two streams 1021*a* and 1021*b* and only attaches one curvature value (e.g., the average or equivalent) at each point (e.g., indicated by a hollow dot) along the "parallel" section of the road. Starting at the point P 1023, where the two streams 1021*a* and 1021*b* diverge, (as indicated by curvature values different by more than the selected threshold), the output module 407 attaches two different values, one value for each transition (e.g., symbolically drawn as black and hollow dots) for each interval along the segment (along the distance from the divergence point 1023 to the end of the link). The same procedure is applied to each road segment connected to an intersection. This way, even if the road geometry (given by the shape points) is just a simplification of the road, with angular connection at the intersections, the curvature associated with these segments still represent the correct curvature of the road (for each transition between two links and for each direction of motion). In step 905, the output module 407 provides the road curvature data for the intersection based on the respective curvatures of the plurality of transitions. By way of example, the curvatures of the transitions can be output as an artifact or data layer of the geographic database 101 as described in the embodiments above.

Returning to FIG. 1, the system 100 comprises one or more probe vehicles 105 and/or one or more probe UEs 109 having connectivity to the mapping platform 103 via a communication network 121. By way of example, the UEs 109 may be an in-vehicle or embedded navigation system, a personal navigation device ("PND"), a portable navigation device, a cellular telephone, a mobile phone, a personal digital assistant ("PDA"), a watch, a camera, a computer and/or other device that can perform navigation or location-based functions (i.e., digital routing and map display). It is contemplated, in future embodiments, that the cellular telephone may be interfaced with an on-board navigation system of an autonomous vehicle or physically connected to the vehicle for serving as the navigation system. Also, the vehicles 105 and/or UEs 109 may be configured to access the communication network 121 by way of any known or still developing communication protocols. Via this communication network 121, the vehicles 105 and/or UEs 109 may transmit probe data as well as access various network based services for facilitating state classification.

Also, the UEs 109 may be configured with mapping, navigation, and/or other location-based applications 111 for interacting with one or more content providers 123a-123j (also collectively referred to as content providers 123), services 119 of a service platform 117, or a combination thereof. Per these services, the applications 111 of the vehicle 105 and/or UE 109 may acquire navigation information, location information, mapping information and other data associated with the current location of the vehicle, a direction or movement of the vehicle along a roadway, etc. Hence, the content providers 123 and services 119 rely upon the gathering of probe data for providing curvature data.

The vehicles 105 and/or UEs 109 may be configured with various sensors 113 for acquiring and/or generating probe data regarding a vehicle, a driver, other vehicles, conditions regarding the driving environment or roadway, etc. For example, sensors 113 may be used as GPS or other positioning receivers for interacting with one or more satellites 115 to determine and track the current speed, position and location of a vehicle travelling along a roadway. In addition, the sensors 113 may gather tilt data (e.g., a degree of incline or decline of the vehicle during travel), motion data, light data, sound data, image data, weather data, temporal data and other data associated with the vehicle and/or UEs 109 thereof. Still further, the sensors 113 may detect local or transient network and/or wireless signals, such as those transmitted by nearby devices during navigation of a vehicle along a roadway. This may include, for example, network routers configured within a premise (e.g., home or business), another UE 109 or vehicle 105 or a communicable traffic system (e.g., traffic lights, traffic cameras, traffic signals, digital signage). In one embodiment, the mapping platform 103 aggregates probe data gathered and/or generated by the vehicles 105 and/or UEs 109 resulting from the driving of multiple different vehicles over a road/travel network.

By way of example, the mapping platform 103 may be implemented as a cloud based service, hosted solution or the like for performing the above described functions. Alternatively, the mapping platform 103 may be directly integrated for processing data generated and/or provided by one or more services 119, content providers 123 or applications 111. Per this integration, the mapping platform 103 may perform client-side state computation of road curvature data.

By way of example, the communication network 121 [MA11] of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for 5G New Radio (5G NR or simply 5G), microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), any other generation of cellular technology, and the like, or any combination thereof.

A UE 109 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 109 can support any type of interface to the user (such as "wearable" circuitry, etc.).

By way of example, the UE 109s, the mapping platform 103, the service platform 117, and the content providers 123 communicate with each other and other components of the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 11:
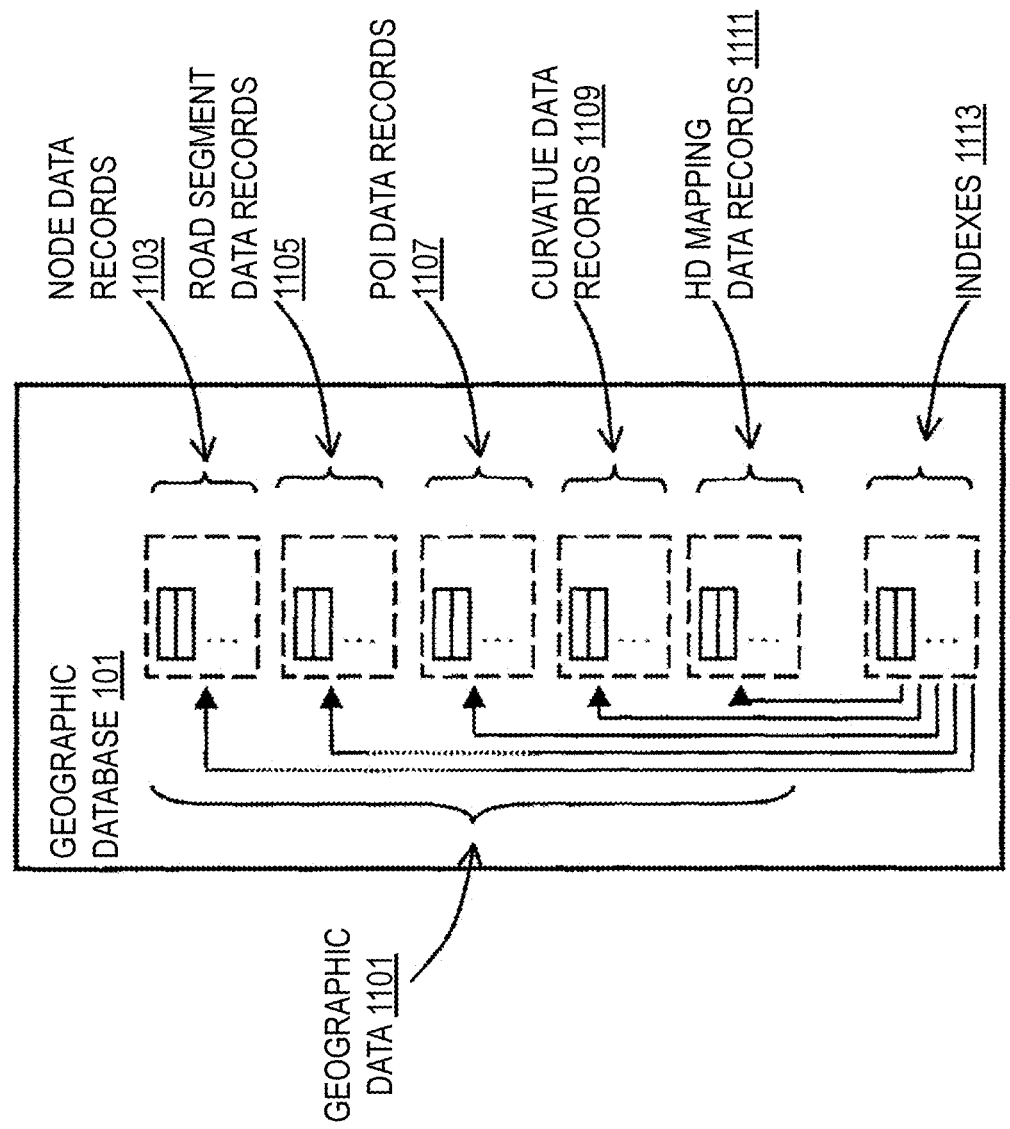
FIG. 11 is a diagram of a geographic database, according to one embodiment.

FIG. 11 is a diagram of a geographic database, according to one embodiment. In one embodiment, the geographic database 101 includes geographic data 1101 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 1101. In one embodiment, the geographic database 101 include high definition (HD) mapping data that provide centimeter-level or better accuracy of map features. For example, the geographic database 101 can be based on Light Detection and Ranging (LiDAR) or equivalent technology to collect billions of 3D points and model road surfaces and other map features down to the number lanes and their widths. In one embodiment, the HD mapping data (e.g., HD data records 1111) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 101.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island).

In one embodiment, a polygon is constructed from one outer simple polygon and none or at least one inner simple polygon. A polygon is simple if it just consists of one simple polygon, or complex if it has at least one inner simple polygon.

In one embodiment, the geographic database 101 follows certain conventions. For example, links do not cross themselves and do not cross each other except at a node. Also, there are no duplicated shape points, nodes, or links. Two links that connect each other have a common node. In the geographic database 101, overlapping geographic features are represented by overlapping polygons. When polygons overlap, the boundary of one polygon crosses the boundary of the other polygon. In the geographic database 101, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 101 includes node data records 1103, road segment or link data records 1105, POI data records 1107, curvature data records 1109, HD mapping data records 1111, and indexes 1113, for example. More, fewer or different data records can be provided. In one embodiment, additional data records (not shown) can include cartographic ("carto") data records, routing data, and maneuver data. In one embodiment, the indexes 1113 may improve the speed of data retrieval operations in the geographic database 101. In one embodiment, the indexes 1113 may be used to quickly locate data without having to search every row in the geographic database 101 every time it is accessed. For example, in one embodiment, the indexes 1113 can be a spatial index of the polygon points associated with stored feature polygons.

In exemplary embodiments, the road segment data records 1105 are links or segments representing roads, streets, or paths, as can be used in the calculated route or recorded route information for determination of one or more personalized routes. The node data records 1103 are end points corresponding to the respective links or segments of the road segment data records 1105. The road link data records 1105 and the node data records 1103 represent a road network, such as used by vehicles, cars, and/or other entities. Alternatively, the geographic database 101 can contain path segment and node data records or other data that represent pedestrian paths or areas in addition to or instead of the vehicle road record data, for example. In one embodiment, the nodes and links can make up the base map and that base map can be associated with an HD layer including more detailed information, like lane level details for each road segment or link and how those lanes connect via intersections. Furthermore, another layer may also be provided, such as an HD live map, where road objects are provided in detail in regards to positioning, which can be used for localization. The HD layers can be arranged in a tile format.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 101 can include data about the POIs and their respective locations in the POI data records 1107. The geographic database 101 can also include data about places, such as cities, towns, or other communities, and other geographic features, such as bodies of water, mountain ranges, etc. Such place or feature data can be part of the POI data records 1107 or can be associated with POIs or POI data records 1107 (such as a data point used for displaying or representing a position of a city).

In one embodiment, the geographic database 101 can also include curvature data records 1109 for storing curvature data for road segments and/or intersections. The curvature data records 1109 can also store related data including but not limited to road slices, fitted curves, underlying probe data, possible transitions at intersections, etc. By way of example, the map embedding data records 1109 can be associated with one or more of the node records 1103, road segment records 1105, and/or POI data records 1107 to associate the map embeddings with specific geographic areas or features. In this way, the map embedding data records 1109 can also be associated with the characteristics or metadata of the corresponding records 1103, 1105, and/or 1107.

In one embodiment, as discussed above, the HD mapping data records 1111 model road surfaces and other map features to centimeter-level or better accuracy (e.g., including centimeter-level accuracy for ground truth objects used for visual odometry based on polyline homogeneity according to the embodiments described herein). The HD mapping data records 1111 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 1111 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 1111 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1111.

In one embodiment, the HD mapping data records 1111 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like. The HD mapping data records may be provided as a separate map layer.

In one embodiment, the geographic database 101 can be maintained by the content provider 123 in association with the services platform 117 (e.g., a map developer). The map developer can collect geographic data to generate and enhance the geographic database 101. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 101 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. Other formats including tile structures for different map layers may be used for different delivery techniques. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 105 and/or UE 109. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing road curvature data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
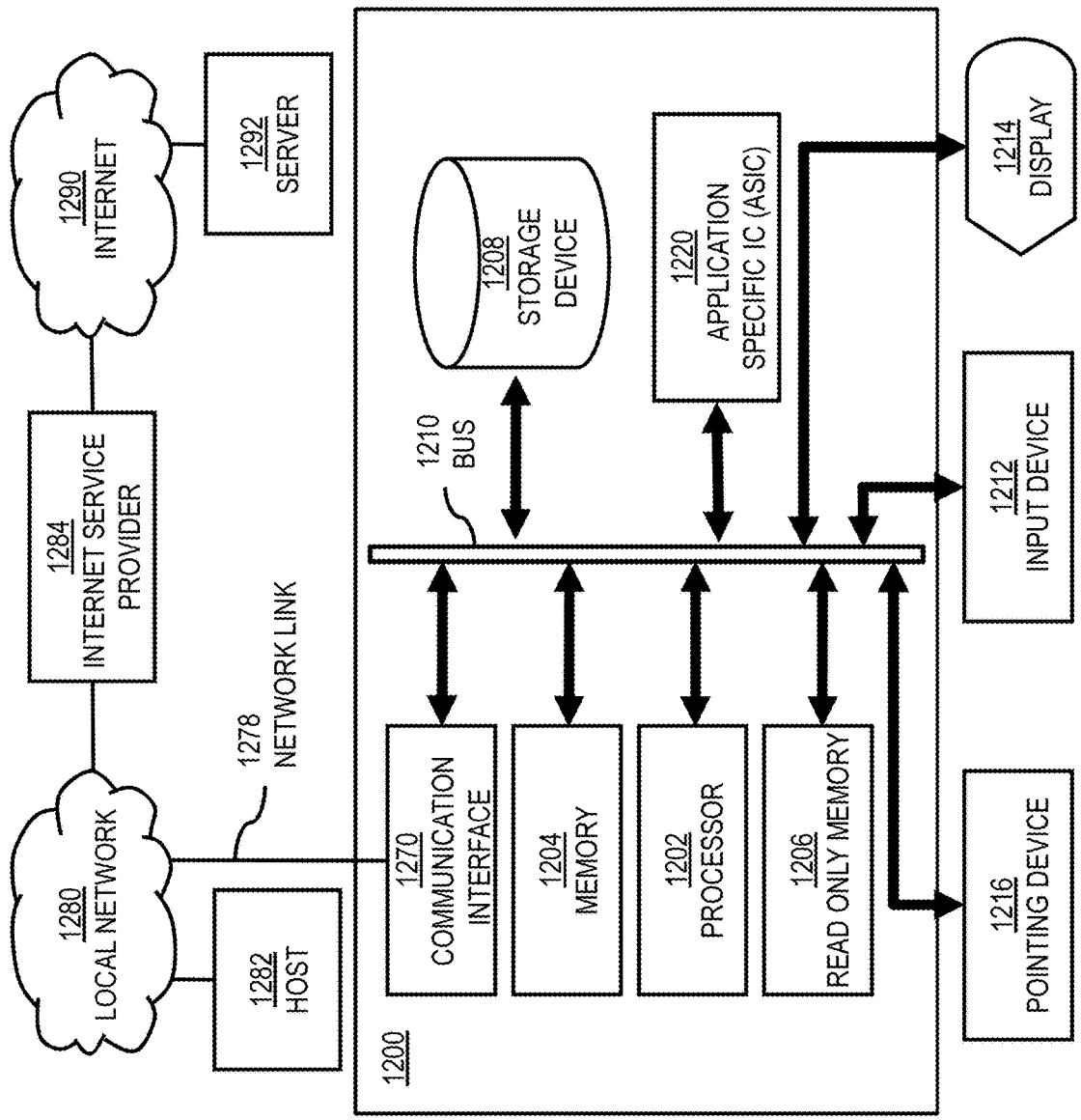
FIG. 12 is a diagram of hardware that can be used to implement an embodiment.

FIG. 12 illustrates a computer system 1200 upon which an embodiment of the invention may be implemented. Computer system 1200 is programmed (e.g., via computer program code or instructions) to provide road curvature data as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to providing road curvature data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for providing road curvature data. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing road curvature data, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 121 for providing road curvature data.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 13 illustrates a chip set 1300 upon which an embodiment of the invention may be implemented. Chip set 1300 is programmed to provide road curvature data as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide road curvature data. The memory 1305 also stores the data associated with or generated by the execution of the inventive steps.

Figure 14:
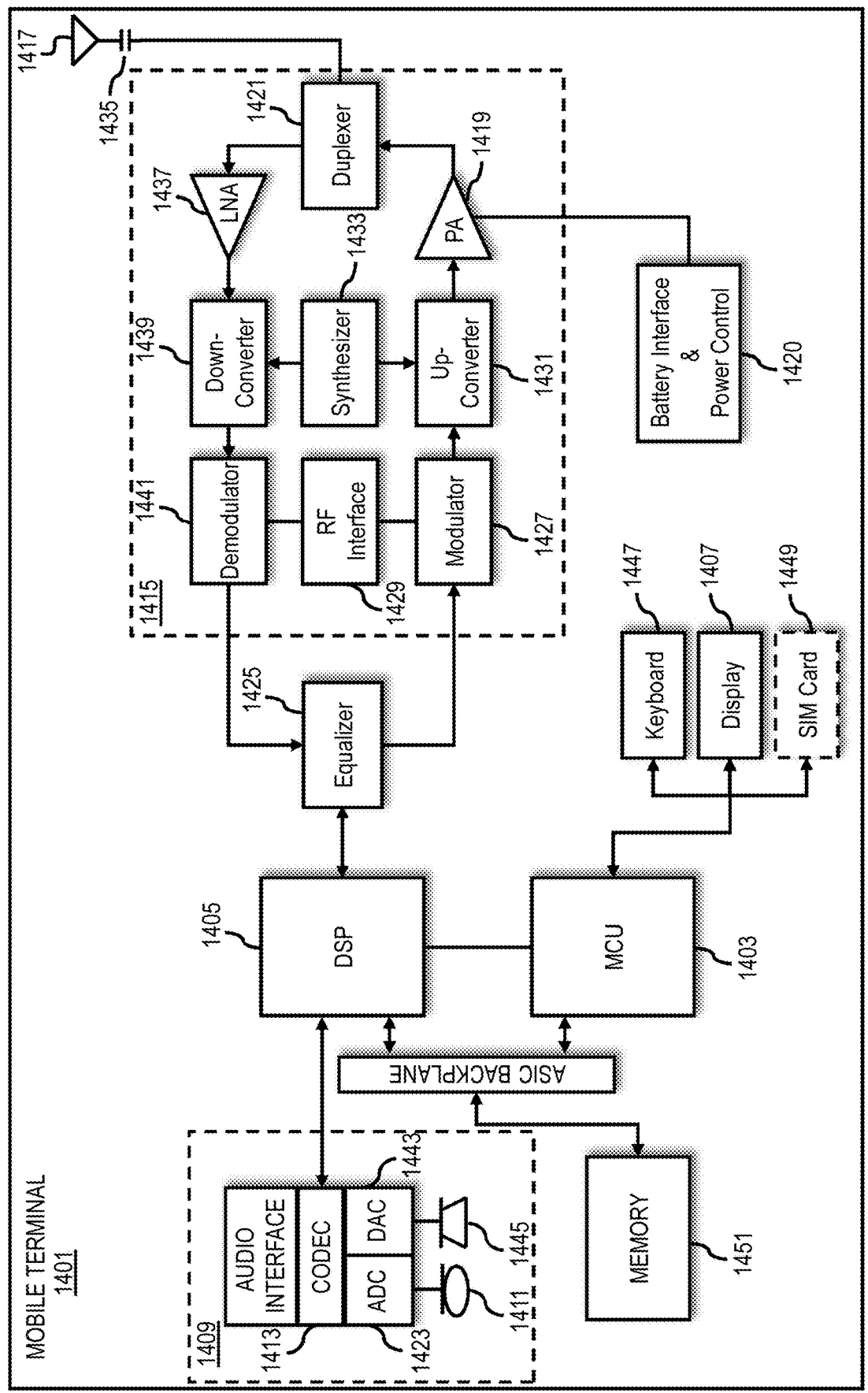
FIG. 14 is a diagram of a mobile terminal that can be used to implement an embodiment.

FIG. 14 is a diagram of exemplary components of a mobile terminal 1401 (e.g., the vehicle 105 or part thereof and/or UE 109) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to provide road curvature data. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1451 may be, but not limited to, a single memory, CD, DVD, ROM, RAM, EEPROM, optical storage, or any other non-volatile or non-transitory storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing road curvature data comprising:
    segmenting a plurality of road segments into a plurality of slices;
    retrieving location trace data for the plurality of slices, wherein the location trace data is collected from one or more location sensors of a plurality of vehicles traversing the plurality of slices;
    computing respective curvatures for the plurality of slices based on the location trace data, wherein the computing respective curvatures comprises:
        segmenting the plurality of location traces into consecutive overlapping subsets of location points; and
        computing a subset curvature for each of the consecutive overlapping subsets of location points, wherein the respective curvatures are computed based on the subset curvature for each of the consecutive overlapping subsets of location points; and
    providing the road curvature data for the plurality of road segments based on the respective curvatures of the plurality of slices.

2. The method of claim 1, wherein the computing of the respective curvatures for the plurality of slices comprises:
    fitting each trace of the location trace data to a respective slice of the plurality of slices to generate a collection of curves,
    wherein each of the respective curvatures is computed from a single curve determined from a respective subset of the collection of curves.

3. The method of claim 1, wherein the computing of the respective curvatures for the plurality of slices comprises:
    determining a subset of the location trace data associated with each slice of the plurality of slices; and
    computing a single curve for each of the subset of the location trace data,
    wherein each of the respective curvatures is computed based on the single curve for said each slice.

4. The method of claim 1, wherein the computing of the respective curvatures for the plurality of slices comprises:
    combining the plurality of location traces into one location sample,
    wherein the respective curvatures are computed based on the one location sample.

5. The method of claim 1, wherein the consecutive overlapping subsets of location points include a designated number of location points.

6. The method of claim 5, the designated number of location points spans a predetermined width.

7. The method of claim 5, wherein the designated number of location points is a triplet of location points.

8. The method of claim 1, further comprising:
    extending the plurality of slices by a predetermined upstream distance, a predetermined downstream distance, or a combination to compute the respective curvatures.

9. The method of claim 1, wherein the plurality of road segments comprises an intersection.

10. An apparatus for providing road curvature data at an intersection comprising:
    at least one processor; and
    at least one memory including computer program code for one or more programs,
    the at least one memory and the computer program code configured to, with the at least one processor, cause the apparatus to perform at least the following,
        determine a plurality of transitions between a plurality of road segments that form the intersection, wherein the plurality of transitions represents a possible path through the intersection identified based on an originating road segment and an ending road segment of the intersection;

retrieve location trace data for the plurality of transitions, wherein the location trace data is collected from one or more location sensors of a plurality of vehicles traversing the plurality of transitions;

compute respective curvatures for the plurality of transitions based on the location trace data; and provide the road curvature data for the intersection based on the respective curvatures of the plurality of transitions.

11. The apparatus of claim 10, wherein the computing of the respective curvatures for the plurality of transitions causes the apparatus to:

fit each trace of the location trace data to a respective slice of the plurality of transitions to generate a collection of curves, wherein each of the respective curvatures is computed from a single curve determined from a respective subset of the collection of curves.

12. The apparatus of claim 10, wherein the computing of the respective curvatures for the plurality of transitions causes the apparatus to:

determine a subset of the location trace data associated with each slice of the plurality of transitions; and compute a single curve for each of the subset of the location trace data, wherein each of the respective curvatures is computed based on the single curve for said each slice.

13. The apparatus of claim 10, wherein the computing of the respective curvatures for the plurality of transitions causes the apparatus to:

combine the plurality of location traces into one location sample, wherein the respective curvatures are computed based on the one location sample.

14. The apparatus of claim 10, wherein the computing of the respective curvatures for the plurality of transitions causes the apparatus to:

segment the plurality of location traces into consecutive overlapping subsets of location points; and compute a subset curvature for each of the consecutive overlapping subsets of location points, wherein the respective curvatures are computed based on the subset curvature for each of the consecutive overlapping subsets of location points.

15. A non-transitory computer readable storage medium for providing road curvature data carrying one or more sequences of one or more instructions which, when executed by one or more processors, cause an apparatus to perform:

segmenting a road segment into a plurality of slices;

retrieving location trace data for the plurality of slices, wherein the location trace data is collected from one or more location sensors of a plurality of vehicles traversing the plurality of slices;

computing respective curvatures for the plurality of slices based on the location trace data, wherein the computing respective curvatures comprises:

segmenting the plurality of location traces into consecutive overlapping subsets of location points; and computing a subset curvature for each of the consecutive overlapping subsets of location points, wherein the respective curvatures are computed based on the subset curvature for each of the consecutive overlapping subsets of location points; and providing the road curvature data for the road segment based on the respective curvatures of the plurality of slices.

16. The non-transitory computer readable storage medium of claim 15, wherein the computing of the respective curvatures for the plurality of slices causes the apparatus to perform:

fitting each trace of the location trace data to a respective slice of the plurality of slices to generate a collection of curves, wherein each of the respective curvatures is computed from a single curve determined from a respective subset of the collection of curves.

17. The non-transitory computer readable storage medium of claim 15, wherein the computing of the respective curvatures for the plurality of slices causes the apparatus to perform:

determining a subset of the location trace data associated with each slice of the plurality of slices; and computing a single curve for each of the subset of the location trace data, wherein each of the respective curvatures is computed based on the single curve for said each slice.

18. The non-transitory computer readable storage medium of claim 15, wherein the computing of the respective curvatures for the plurality of slices causes the apparatus to perform:

combining the plurality of location traces into one location sample, wherein the respective curvatures are computed based on the one location sample.

* * * * *